«12» United States Patent
Zhang

«10» Patent No.: US 10,972,914 B2
«45» Date of Patent: Apr. 6, 2021

«54» IMAGE SHARING METHOD AND SYSTEM, AND ELECTRONIC DEVICE

«71» Applicant: Huawei Technologies Co., Ltd., Shenzhen (CN)

«72» Inventor: Wei Zhang, Shenzhen (CN)

«73» Assignee: HUAWEI TECHNOLOGIES CO., LTD., Shenzhen (CN)

«*» Notice: Subject to any disclaimer, the term of this patent is extended or adjusted under 35 U.S.C. 154(b) by 2 days.

«21» Appl. No.: 16/492,786

«22» PCT Filed: Mar. 9, 2018

«86» PCT No.: PCT/CN2018/078586
§ 371 (c)(1),
(2) Date: Sep. 10, 2019

«87» PCT Pub. No.: WO2018/161962
PCT Pub. Date: Sep. 13, 2018

«65» Prior Publication Data
US 2020/0076876 A1 Mar. 5, 2020

«30» Foreign Application Priority Data
Mar. 10, 2017 (WO) ............... PCT/CN2017/076329

«51» Int. Cl.
*H04W 12/06* (2009.01)
*H04W 76/14* (2018.01)
(Continued)

«52» U.S. Cl.
CPC ...... *H04W 12/0605* (2019.01); *G06F 3/0482* (2013.01); *G06F 3/04817* (2013.01);
(Continued)

«58» Field of Classification Search
CPC .... G06F 21/32; G06F 3/04817; G06F 3/0482; G06F 3/04883; G06K 9/00288;
(Continued)

«56» References Cited

U.S. PATENT DOCUMENTS 9,036,192 B2 * 5/2015 Watanabe .......... H04N 1/00095
358/1.15
2007/0071290 A1 * 3/2007 Shah .................. G06K 9/00288
382/118
(Continued)

FOREIGN PATENT DOCUMENTS

CN 103856668 A 6/2014
CN 103945001 A 7/2014
(Continued)

OTHER PUBLICATIONS

Richard Padilla How to Use AirDrop to Share Files Between Macs and iOS Devices Oct. 29, 2014 13 pages (Year: 2014).*
(Continued)

*Primary Examiner* — Andrea N Long
«74» *Attorney, Agent, or Firm* — Conley Rose, P.C.

«57» ABSTRACT

An image sharing method is implemented on a first electronic device having a touchscreen includes establishing, by the first electronic device, a first wireless link with a second electronic device by using a short-range wireless communications technology. The method further includes sending, by the first electronic device, face feature information to the second electronic device over the first wireless link. The method further includes receiving, by the first electronic device, a matching result sent by the second electronic device. When the first electronic device determines that the matching result is matching success information, the method further includes sending, by the first electronic device, an
(Continued)

image (for example, a photo or a video) corresponding to the face feature information to the second electronic device.

20 Claims, 11 Drawing Sheets

(51) Int. Cl.
    *G06F 3/0481*      (2013.01)
    *G06F 3/0482*      (2013.01)
    *G06F 3/0488*      (2013.01)
    *G06K 9/00*      (2006.01)
    *H04L 29/08*      (2006.01)

(52) U.S. Cl.
    CPC ..... *G06F 3/04883* (2013.01); *G06K 9/00288* (2013.01); *H04L 67/06* (2013.01); *H04W 76/14* (2018.02)

(58) Field of Classification Search
    CPC .... H04L 29/06; H04L 67/06; H04W 12/0605; H04W 36/14; H04W 76/14; H04W 84/12; H04W 84/18
    See application file for complete search history.

(56) References Cited

U.S. PATENT DOCUMENTS

| | | | |
|---|---|---|---|
| 2013/0103742 A1* | 4/2013 | Hsi | H04N 1/00159 709/203 |
| 2013/0342708 A1 | 12/2013 | Chou et al. | |
| 2014/0153017 A1 | 6/2014 | Watanabe et al. | |
| 2015/0106765 A1* | 4/2015 | Lee | G06F 21/32 715/810 |
| 2015/0227782 A1* | 8/2015 | Salvador | G06F 16/5854 382/118 |
| 2016/0267285 A1 | 9/2016 | Ruben et al. | |
| 2017/0374208 A1 | 12/2017 | Wu et al. | |

FOREIGN PATENT DOCUMENTS

| | | |
|---|---|---|
| CN | 105025162 A | 11/2015 |
| CN | 105740426 A | 7/2016 |
| CN | 105897564 A | 8/2016 |
| CN | 106096011 A | 11/2016 |
| CN | 106326820 A | 1/2017 |

OTHER PUBLICATIONS

Ashwin Bharambe, Zack Gomez, Will Ruben "Under the hood: Building Moments" Jun. 15, 2015 9 pages (Year: 2015).*
Machine Translation and Abstract of Chinese Publication No. CN103945001, Jul. 23, 2014, 14 pages.
Machine Translation and Abstract of Chinese Publication No. CN105025162, Nov. 4, 2015, 10 pages.
Machine Translation and Abstract of Chinese Publication No. CN105740426, Jul. 6, 2016, 19 pages.
Machine Translation and Abstract of Chinese Publication No. CN105897564, Aug. 24, 2016, 31 pages.
Machine Translation and Abstract of Chinese Publication No. CN106326820, Jan. 11, 2017, 25 pages.
Foreign Communication From A Counterpart Application, PCT Application No. PCT/CN2017/076329, English Translation of International Search Report dated May 27, 2017, 2 pages.
Foreign Communication From A Counterpart Application, PCT Application No. PCT/CN2017/076329, English Translation of Written Opinion dated May 27, 2017, 3 pages.
Foreign Communication From A Counterpart Application, PCT Application No. PCT/CN2018/078586, English Translation of International Search Report dated May 22, 2018, 3 pages.
Foreign Communication From A Counterpart Application, PCT Application No. PCT/CN2018/078586, English Translation of Written Opinion dated May 22, 2018, 5 pages.

* cited by examiner

IMAGE SHARING METHOD AND SYSTEM, AND ELECTRONIC DEVICE

CROSS-REFERENCE TO RELATED APPLICATIONS

This application is a national stage of International Application No. PCT/CN2018/078586, filed on Mar. 9, 2018, which claims priority to International Application No. PCT/CN2017/076329, filed on Mar. 10, 2017. Both of the aforementioned applications are hereby incorporated by reference in their entireties.

TECHNICAL FIELD

Embodiments of the present invention relate to the field of mobile communications, and in particular, to an image sharing method and system, and an electronic device.

BACKGROUND

With rapid development of the mobile Internet, an increasing quantity of electronic devices example, a mobile phone and a tablet computer) can share an image (for example, a picture or a video). For example, a user may select some pictures in a mobile phone A, find an object to which the user intends to send the pictures, and send the pictures to a specified mobile phone B by using Wi-Fi or Bluetooth. A user of the mobile phone B needs to determine whether to receive the pictures shared by the user of the mobile phone A. If the mobile phone B determines to receive the pictures, the mobile phone A transmits the pictures to a memory of the mobile phone B by using Wi-Fi or Bluetooth. It may be learned that in the prior art, a method for sharing a file between two electronic devices is quite complex, and users need to perform a plurality of operations. Consequently, efficiency of sharing the file between the electronic devices is low, and a capability of intelligent interaction between an electronic device and a user is also weakened.

SUMMARY

To resolve the foregoing technical problems, this application provides an image sharing method and an electronic device, so that operation steps of a user can be reduced when the electronic device shares an image, thereby increasing transaction processing efficiency of the electronic device, and also improving a capability of intelligent interaction between the electronic device and the user.

According to a first aspect, this application provides an image sharing method. The method is implemented on a first electronic device having a touchscreen. The method may include: establishing, by the first electronic device, a first wireless link with a second electronic device by using a short-range wireless communications technology; sending, by the first electronic device, face feature information to the second electronic device over the first wireless link; receiving, by the first electronic device, a matching result sent by the second electronic device; and when the first electronic device determines that the matching result is matching success information, sending, by the first electronic device, an image (for example, a photo or a video) corresponding to the face feature information to the second electronic device. According to the foregoing embodiment, the first electronic device may automatically send an image (for example, a photo or a video) related to a user of the second electronic device to the second electronic device without an operation of a user of the first electronic device. In this way, image sharing efficiency of an electronic device is increased, an intelligent image processing capability of the electronic device is also improved, and user experience is also improved.

In a possible implementation, the first electronic device may send the image corresponding to the face feature information to the second electronic device over a second wireless link, where a standard transmission rate of the second wireless link is greater than a standard transmission rate of the first wireless link. Because a capacity of the image is usually large, the image needs to be transmitted more rapidly over a wireless link having a large standard transmission rate. In this way, the image sharing efficiency of the electronic device is further increased. For example, the first wireless link may be a Bluetooth link, and the second wireless link may be a Wi-Fi link or an LTE link.

In another possible implementation, the face feature information sent by the first electronic device to the second electronic device may be specifically face feature information corresponding to a recently captured image in an album application. The recently captured image is an image that was captured in several days prior to a current date, for example, face feature information in a photo/video that was captured in last three days. Correspondingly, in step S407, the image corresponding to the face feature information may be a photo/video that was captured in last three days, or the like. Advantages of sending the recently captured image instead of all images corresponding to the face feature information are that resource waste of the first electronic device is reduced, and a capability of intelligent interaction between the first electronic device and the user is also improved.

In another possible implementation, that when the first electronic device determines that the matching result is matching success information, sending, by the first electronic device, an image corresponding to the face feature information to the second electronic device may specifically include the following steps: when the matching result information is matching success information, displaying, by the first electronic device, the image corresponding to the face feature information on the touchscreen, and reminding a user of whether to share the image with another user; detecting, by the first electronic device, a first operation; and in response to the first operation, sending, by the first electronic device, the image to the second electronic device over the first wireless link or the second wireless link. In this embodiment, the first electronic device may first pop up a prompt box on the touchscreen, to remind the user of whether to send the image. Only after the user taps a sending indication control, the first electronic device sends the image to the second electronic device. In this way, the first electronic device can be prevented from incorrectly sending an image that the user is unwilling to share to the second electronic device, thereby improving user experience.

In another possible implementation, when the first electronic device is sending the image corresponding to the face feature information but has not completed sending of all of the image, the first electronic device may further detect a signal strength of the first wireless link in real time. If the first electronic device determines that the signal strength of the first wireless link is being weakened and the signal strength is weakened to a value less than or equal to a preset strength threshold, it indicates that a distance between the first electronic device and the second electronic device is being increased. Therefore, the first electronic device may automatically stop step S407 of image sharing. For a remaining image that is not sent, when the user enables the album application next time, the user is reminded of whether to choose to continue to share the image with the second electronic device in another manner. For example, the remaining image that is not sent is sent by using an LTE network. If the first electronic device receives a determining operation of the user, the first electronic device sends the remaining image by using the LTE network.

According to a second aspect, this application further provides an image sharing method. The method may be implemented on a first electronic device and a second electronic device. The foregoing method may specifically include: establishing, by the first electronic device, a first wireless link with the second electronic device by using a short-range wireless communications technology; sending, by the first electronic device, face feature information to the second electronic device over the first wireless link; receiving, by the second electronic device, the face feature information; matching, by the second electronic device, the received face feature information and stored user face feature information; sending, by the second electronic device, a matching result to the first electronic device over the first wireless link; receiving, by the first electronic device, the matching result; when the first electronic device determines that the matching result is matching success information, sending, by the first electronic device, an image (for example, a photo or a video) corresponding to the face feature information to the second electronic device; and receiving and storing, by the second electronic device, the image sent by the first electronic device. According to the foregoing embodiment, the first electronic device may automatically send an image (for example, a photo or a video) related to a user of the second electronic device to the second electronic device without an operation of a user of the first electronic device. In this way, image sharing efficiency of an electronic device is increased, an intelligent image processing capability of the electronic device is also improved, and user experience is also improved.

In a possible implementation, the first electronic device may send the image corresponding to the face feature information to the second electronic device over a second wireless link, where a standard transmission rate of the second wireless link is greater than a standard transmission rate of the first wireless link. Because a capacity of the image is usually large, the image needs to be transmitted more rapidly over a wireless link having a large standard transmission rate. In this way, the image sharing efficiency of the electronic device is further increased. For example, the first wireless link may be a Bluetooth link, and the second wireless link may be a Wi-Fi link or an LTE link.

In another possible implementation, the face feature information sent by the first electronic device to the second electronic device may be specifically face feature information corresponding to a recently captured image in an album application. The recently captured image is an image that was captured in several days prior to a current date, for example, face feature information in a photo/video that was captured in last three days. Correspondingly, in step S407, the image corresponding to the face feature information may be a photo/video that was captured in last three days, or the like. Advantages of sending the recently captured image instead of all images corresponding to the face feature information are that resource waste of the first electronic device is reduced, and a capability of intelligent interaction between the first electronic device and the user is also improved.

In another possible implementation, that when the first electronic device determines that the matching result is matching success information, sending, by the first electronic device, an image corresponding to the face feature information to the second electronic device may specifically include the following steps: when the matching result information is matching success information, displaying, by the first electronic device, the image corresponding to the face feature information on a touchscreen, and reminding a user of whether to share the image with another user; detecting, by the first electronic device, a first operation; and in response to the first operation, sending, by the first electronic device, the image to the second electronic device over the first wireless link or the second wireless link. In this embodiment, the first electronic device may first pop up a prompt box on the touchscreen, to remind the user of whether to send the image. Only after the user taps a sending indication control, the first electronic device sends the image to the second electronic device. In this way, the first electronic device can be prevented from incorrectly sending an image that the user is unwilling to share to the second electronic device, thereby improving user experience.

In a possible implementation, after the second electronic device stores the foregoing image, the second electronic device may generate a sub-album in the album application. Content of the sub-album is the image sent by the first electronic device, and a name of the sub-album may be "image shared by the first electronic device".

According to a third aspect, this application further provides an image sharing method. The method may include: sending, by a first electronic device, request information to a cloud server, where the request information may include user identifier information of the first electronic device; receiving, by the first electronic device, location sharing information sent by the cloud server; establishing, by the first electronic device, a third wireless link with a second electronic device by using a short-range wireless communications technology, where the short-range wireless communications technology in this embodiment of this application may be a technology capable of implementing short-range communication, for example, Wi-Fi, Bluetooth, ZigBee, IrDA, or ultra-wideband; establishing, by the first electronic device, a fourth wireless link with a third electronic device by using a short-range wireless communications technology; sending, by the first electronic device, face feature information to the second electronic device over the third wireless link; sending, by the first electronic device, the face feature information to the third electronic device over the fourth wireless link; receiving, by the first electronic device, a second matching result sent by the second electronic device and a third matching result sent by the third electronic device; and when the first electronic device determines that the second matching result is matching failure information and the third matching result is matching success information, sending, by the first electronic device, an image corresponding to the face feature information to the third electronic device over the fourth wireless link. The first electronic device in this embodiment of this application sends the face feature information to all other nearby electronic devices. After receiving two or more matching results, the first electronic device sends the image corresponding to the face feature information to only another electronic device whose matching result indicates matching success (for example, the foregoing third electronic device). In this way, the first electronic device can share a recent image in a quite convenient and safe manner, thereby increasing efficiency of the first electronic device, and also improving user experience.

According to a fourth aspect, this application provides an electronic device, including a touchscreen, a memory, one or more processors, a plurality of application programs, and one or more programs, where the one or more programs are stored in the memory, and when the one or more processors execute the one or more programs, the electronic device is enabled to implement the method according to the foregoing aspects.

According to a fifth aspect, this application further provides an electronic device. The electronic device may include: a touchscreen, where the touchscreen includes a touch-sensitive surface and a display; one or more processors; a memory; a plurality of application programs; and one or more computer programs, where the one or more computer programs are stored in the memory, the one or more computer programs include instructions, and when the instructions are executed by the electronic device, the electronic device is enabled to perform the method according to the foregoing aspects.

According to a sixth aspect, an embodiment of this application further provides an image sharing apparatus. The apparatus has a function of implementing behavior of an electronic device in an implementation of the foregoing method. The function may be implemented by hardware, or may be implemented by hardware by executing corresponding software. The hardware or software includes one or more modules corresponding to the foregoing function.

Another aspect of this application provides a computer-readable storage medium. The computer-readable storage medium stores an instruction, and when the instruction is run on a computer, the computer is enabled to perform the method according to the foregoing aspects.

Another aspect of this application provides a computer program product including an instruction. When the computer program product is run on a computer, the computer is enabled to perform the method according to the foregoing aspects.

It should be understood that descriptions of technical features, technical solutions, advantages or similar languages in this specification do not imply that all features and advantages can be achieved in any single embodiment. On the contrary, it may be understood that descriptions of features or advantages mean that a particular technical feature, technical solution, or advantage is included in at least one embodiment. Therefore, descriptions of the technical features, technical solutions, or advantages in this specification do not necessarily refer to a same embodiment. Further, the technical features, technical solutions, and advantages described in the following embodiments may be combined in any suitable manner. A person skilled in the art understands that the embodiments can be implemented without one or more particular technical features, technical solutions, or advantages of a particular embodiment. In other embodiments, additional technical features and advantages may be further identified in a particular embodiment that does not embody all embodiments.

DESCRIPTION OF EMBODIMENTS

Terms used in the following embodiments of this application are only intended to describe particular embodiments, and are not intended to limit this application. As used in this specification and the claims of this application, a singular expression form, "one", "a", "said", "foregoing", "the", or "this", is intended to also include a plural expression form, unless clearly indicated to the contrary in the context. It should also be understood that, the term "and/or" used in the embodiments of this application indicates and includes any or all possible combinations of one or more associated listed items.

An electronic device, a graphical user interface (GUI for short) used for such an electronic device, and an embodiment in which such an electronic device is used are described below. In some embodiments of this application, the electronic device may be a portable electronic device also including other functions such as personal digital assistant and/or music player functions, for example, a mobile phone, a tablet computer, or a wearable device (for example, smartwatch) having a wireless communications function. An example of an embodiment of the portable electronic device includes but is not limited to a portable electronic device carrying an iOS®, an Android®, a Microsoft®, or another operating system. The portable electronic device may alternatively be another portable electronic device such as a laptop computer (Laptop) having a touch-sensitive surface (for example, a touch panel). It should be further understood that in some other embodiments of this application, the electronic device may alternatively be a desktop computer having a touch-sensitive surface (for example, a touch panel) other than a portable electronic device.

Figure 1:
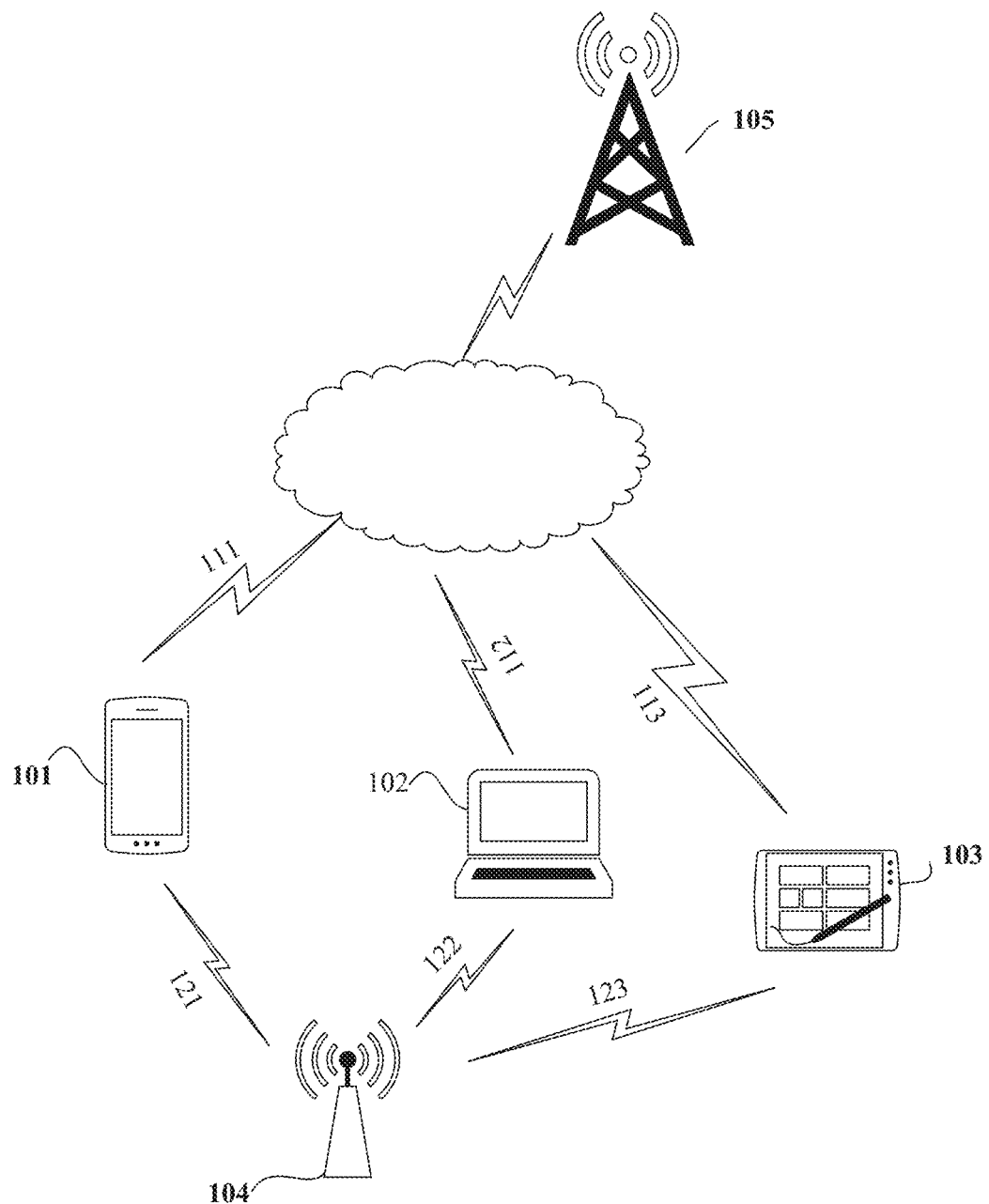
FIG. 1 is a schematic diagram of an environment in which various electronic devices are in a communications network in some embodiments.

FIG. 1 is a schematic diagram of an environment in which various electronic devices are in a wireless communications network. One or more electronic devices may perform wireless communication with a base station or a server by using a wireless link. For example, a mobile phone 101 may perform wireless communication with a base station 105 of a network side by using a wireless link 111. A portable computer 102 may perform wireless communication with the base station 105 by using a wireless link 112. A tablet computer 103 may also perform wireless communication with the base station 105 by using a wireless link 113. It may be understood that base stations performing wireless communication with the mobile phone 101, the portable computer 102, and the tablet computer 103 may be not a same base station because the three types of electronic devices may be not in a same cell (that is, a signal coverage area of a same base station). In some other embodiments of this application, the mobile phone 101 may perform short-range wireless communication with a wireless access point 104 by using a wireless link 121. The portable computer 102 may also perform short-range wireless communication with the wireless access point 104 by using a wireless link 122. The tablet computer 103 may also perform short-range wireless communication with the wireless access point 104 by using a wireless link 123. The foregoing short-range wireless communication may be wireless communication following a standard protocol related to Wi-Fi. Correspondingly, the wireless access point 104 may be a Wi-Fi hotspot. The foregoing short-range wireless communication may alternatively be wireless communication following a standard protocol related to Bluetooth. Correspondingly, the wireless access point 104 may be a Bluetooth beacon (Beacon). In some other embodiments of this application, the mobile phone 101, the portable computer 102, and the tablet computer 103 may alternatively communicate with each other in another wireless communication manner.

Figure 2:
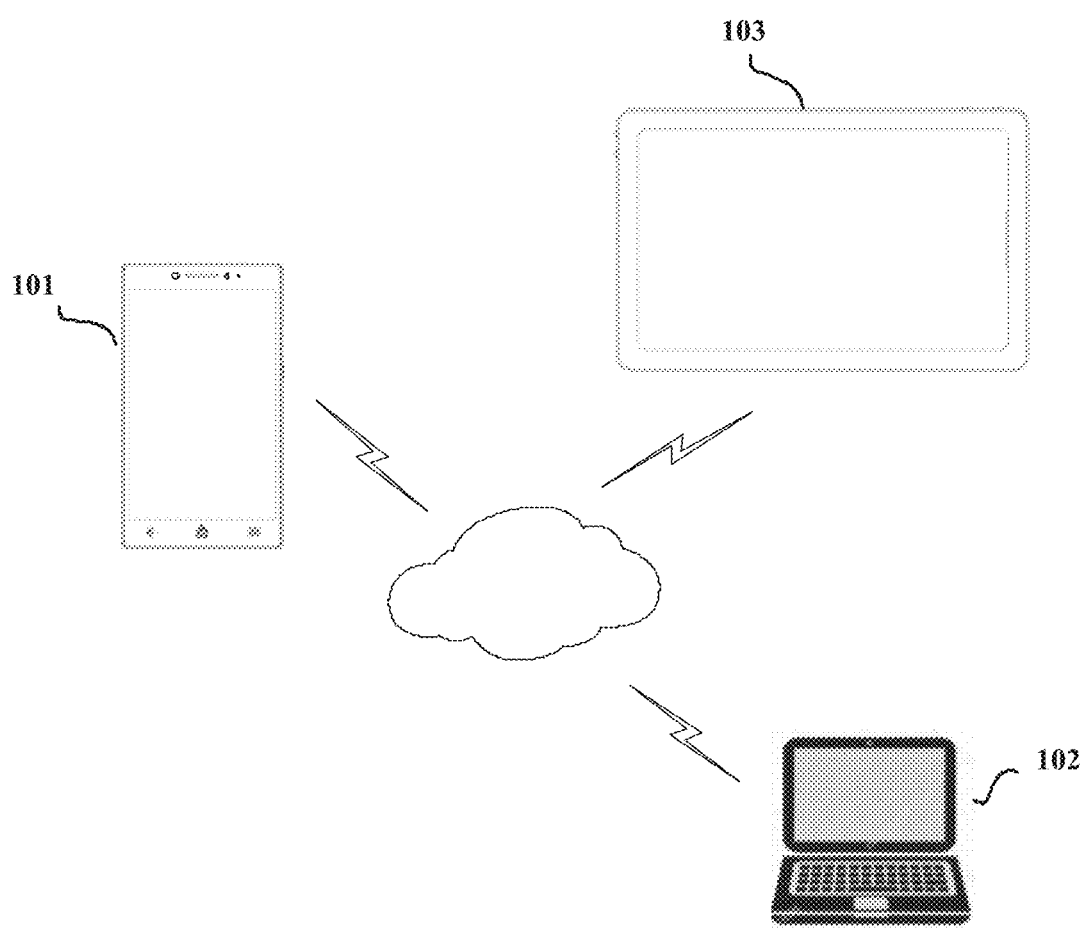
FIG. 2 is a schematic diagram of a usage scenario of a mobile phone, a tablet computer, and a portable computer in some embodiments.

In some embodiments of this application, as shown in FIG. 2, a mobile phone 101, a portable computer 102, and a tablet computer 103 may establish Wi-Fi links between each other in a Wi-Fi Direct manner, forming a wireless local area network. The three electronic devices may transmit files (for example, a picture, a video, and a document) between each other by using the wireless local area network. In some other embodiments of this application, the foregoing three electronic devices may alternatively establish Bluetooth links between each other by using Bluetooth beacons, forming a wireless local area network. The three electronic devices may alternatively transmit files between each other by using the wireless local area network.

Figure 3:
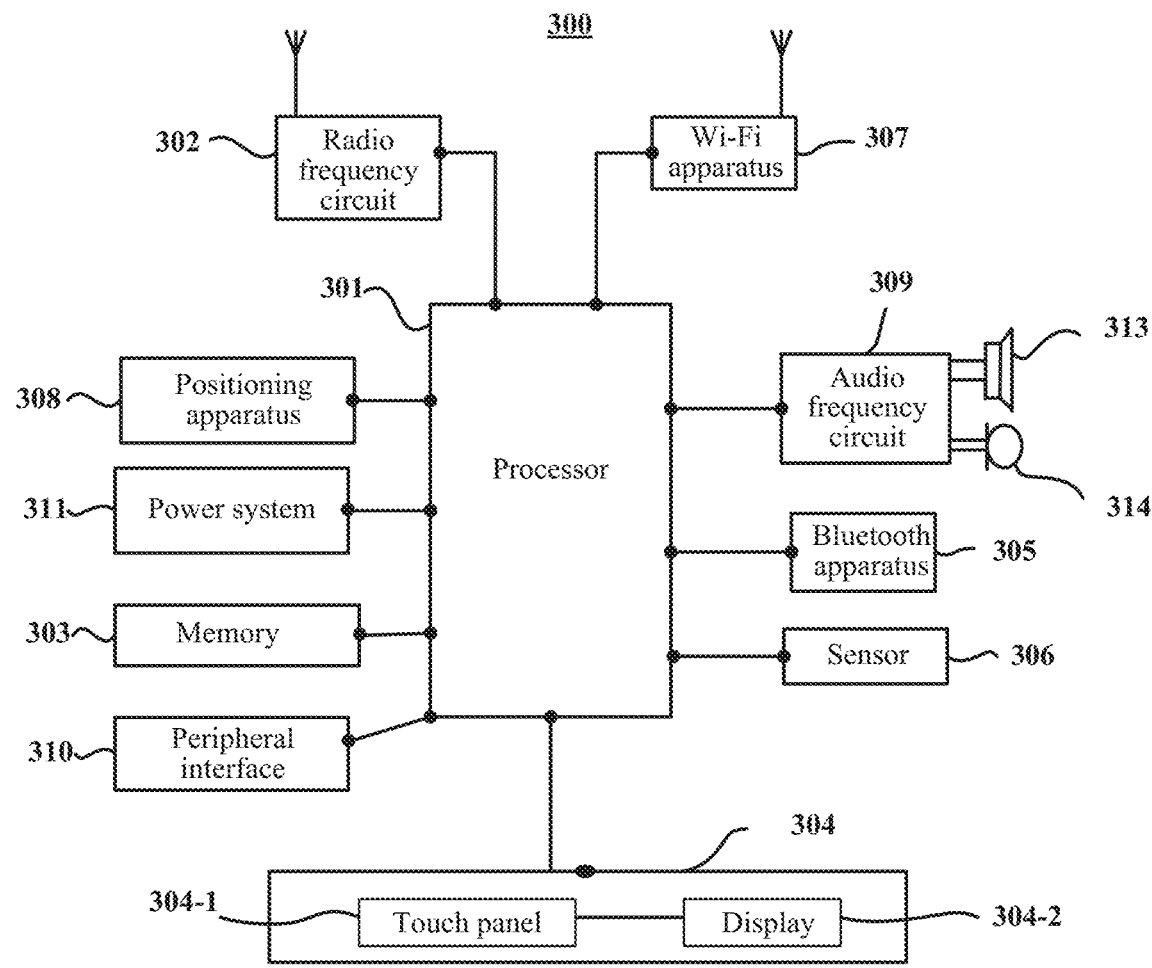
FIG. 3 is a schematic diagram of a hardware structure of an electronic device in some embodiments.

FIG. 3 is a schematic diagram of a hardware structure of an electronic device 300 (for example, a mobile phone) used in the following embodiments. It should be understood that the electronic device 300 shown in the figure is only an example of the electronic device, and the electronic device 300 may have more or fewer parts than those shown in the figure, may combine two or more parts, or may have a different part configuration. The parts shown in the figure may be implemented in hardware including one or more signal processing and/or application-specific integrated circuits, software, or a combination of hardware and software.

Referring to FIG. 3, the electronic device 300 may include parts such as a processor 301, a radio frequency (RF) circuit 302, a memory 303, a touchscreen 304, a Bluetooth apparatus 305, one or more sensors 306, a Wi-Fi apparatus 307, a positioning apparatus 308, an audio frequency circuit 309, a peripheral interface 310, and a power apparatus 311. These parts may communicate with each other by using one or more communications buses or signal cables (not shown in FIG. 3). A person skilled in the art may understand that the hardware structure shown in FIG. 3 does not constitute a limitation on the electronic device. The electronic device 300 may include more or fewer parts than those shown in the figure, may combine some parts, or may have a different part arrangement.

Each part of the electronic device 300 is described below in detail with reference to FIG. 3.

The processor 301 is a control center of the electronic device 300, connects parts of the electronic device 300 by using various interfaces and lines, and performs various functions of the electronic device 300 and processes data by operating or executing an application program stored in the memory 303 and invoking the data stored in the memory 303. In some embodiments, the processor 301 may include one or more processing units. The processor 301 may further integrate an application processor and a modem processor. The application processor mainly processes an operating system, a user interface, an application program, and the like. The modem processor mainly processes wireless communication. It may be understood that the foregoing modem processor may alternatively be not integrated into the processor 301. For example, the processor 301 may be a Kirin 960 chip manufactured by Huawei Technologies Co., Ltd.

The radio frequency circuit 302 may be configured to receive and send a radio signal during information receiving/sending or a call. Specially, the radio frequency circuit 302 may receive downlink data of a base station and then send the downlink data to the processor 301 for processing. In addition, the radio frequency circuit 302 sends uplink-related data to the base station. The radio frequency circuit Usually includes but is not limited to an antenna, at least one amplifier, a transceiver, a coupler, a low noise amplifier, a duplexer, and the like. In addition, the radio frequency circuit 302 may also communicate with another device through wireless communication. The wireless communication may use any communication standard or protocol, including but not limited to, Global System for Mobile Communications, General Packet Radio Service, Code Division Multiple Access, Wideband Code Division Multiple Access, Long Term Evolution, email, short message service, or the like.

The memory 303 is configured to store the application program and data. The processor 301 performs various functions of the electronic device 300 and processes data by running the application program and the data stored in the memory 303. The memory 303 mainly includes a program storage area and a data storage area. The program storage area may store an operating system, and an application program required by at least one function (such as a sound playback function and an image display function). The data storage area may store data (such as audio data and an address book) created based on use of the electronic device 300. In addition, the memory 303 may include a high-speed random access memory, and may further include a non-volatile memory such as a disk storage memory, a flash memory, or another volatile solid-state memory. The memory 303 may store various operating systems, such as an iOS® operating system developed by Apple Inc. and an Android® operating system developed by Google Inc.

The touchscreen 304 may include a touch panel 304-1 and a display 304-2. The touch panel 304-1 may collect a touch event of a user of the electronic device 300 on or near the electronic device 300 (for example, an operation of the user on or near the touch panel 304-1 by using any suitable object such as a finger or a stylus), and send collected touch information to another component such as the processor 301. The operation of the user near the touch panel 304-1 may be referred to as floating touch. The touch panel 304-1 that can perform floating touch may be implemented by using a capacitive touch panel, an infrared sensing touch panel, an ultrasonic touch panel, and the like. The touch panel 304-1 may include two parts: a touch detection apparatus and a touch controller. The touch detection apparatus detects a touch position of the user, detects a signal generated by the touch operation, and transmits the signal to the touch controller. The touch controller receives touch information from the touch detection apparatus, converts the touch information into touch point coordinates, and then sends the touch point coordinates to the processor 301. The touch controller may further receive and execute an instruction sent by the processor 301. In addition, the touch panel 304-1 may be implemented in a plurality of types, such as a resistive type, a capacitive type, an infrared type, and a surface acoustic wave type. The display (which is also referred to as a display screen) 304-2 may be configured to display information entered by the user or information provided for the user, and various menus of the electronic device 300. The display 304-2 may be configured in a form of a liquid crystal display, an organic light-emitting diode, or the like. The touch panel 304-1 may cover the display 304-2. When detecting a touch event on or near the touch panel, the touch panel 304-1 transmits the touch event to the processor 301, to determine a type of the touch event. Then, the processor 301 may provide a corresponding visual output on the display 304-2 based on the type of the touch event. Although, in FIG. 3, the touch panel 304-1 and the display screen 304-2 are used as two separate parts to implement input and output functions of the electronic device 300, in some embodiments, the touch panel 304-1 and the display screen 304-2 may be integrated to implement the input and output functions of the electronic device 300. It may be understood that the touchscreen 304 is formed by stacking a plurality of layers of materials. In this embodiment of this application, only the touch panel (layer) and the display screen (layer) are presented, and another layer is not described in this embodiment of this application.

The Bluetooth apparatus 305 is configured to implement data exchange between the electronic device 300 and another short-range electronic device (for example, a mobile phone or a smartwatch). The Bluetooth apparatus in this embodiment of this application may be an integrated circuit, a Bluetooth chip, or the like.

The electronic device 300 may further include at least one sensor 306 such as an optical sensor, a motion sensor, and another sensor. Specifically, the optical sensor may include an ambient light sensor and a proximity sensor. The ambient light sensor may adjust luminance of the display of the touchscreen 304 based on brightness of ambient light. The proximity sensor may switch off a power supply of the display when the electronic device 300 is moved to an ear. As one type of motion sensor, an acceleration sensor may detect magnitude of accelerations in various directions (usually, tri-axial), can detect magnitude and a direction of a gravity force when the electronic device 300 is static, and may be applied to an application that recognizes a posture of a mobile phone (for example, switching between landscape orientation and portrait orientation, a related game, and magnetometer posture calibration), and functions related to vibration recognition (such as a pedometer and tapping), and the like. For other sensors such as a gyroscope, a barometer, a hygrometer, a thermometer, and an infrared sensor that may be further configured for the electronic device 300, details are not described herein.

The Wi-Fi apparatus 307 is configured to provide network access following a standard protocol related to Wi-Fi for the electronic device 300. The electronic device 300 may access a Wi-Fi wireless access point by using the Wi-Fi apparatus 307, to help the user receive/send an email, browse a web page, and access streaming media. The Wi-Fi apparatus 307 provides wireless broadband Internet access for the user. In some other embodiments, the Wi-Fi apparatus 307 may alternatively be used as a wireless access point, and may provide network access for another electronic device.

The positioning apparatus 308 is configured to provide a geographic location for the electronic device 300. It may be understood that the positioning apparatus 308 may be specifically a receiver of a positioning system such as a Global Positioning System (GPS), a BeiDou Navigation Satellite System, or a GLONASS. After receiving the geographic location sent by the foregoing positioning system, the positioning apparatus 308 sends the information to the processor 301 for processing, or sends the information to the memory 303 for storing. In some other embodiments, the positioning apparatus 308 may be a receiver of an Assisted Global Positioning System (AGPS). The AGPS is a running manner in which GPS positioning is performed under assisted cooperation. The AGPS can accelerate a positioning speed of the electronic device 300 by using a signal of a base station in cooperation with a signal of a GPS satellite. In the AGPS system, the positioning apparatus 308 may obtain positioning assistance by communicating with an assisted positioning cloud server (for example, a positioning cloud server of the mobile phone). The AGPS system is used as an assisted cloud server, to assist the positioning apparatus 308 in completing ranging and positioning services. In this case, the assisted positioning cloud server communicates with an electronic device, for example, the positioning apparatus 308 (namely, the GPS receiver) of the electronic device 300, by using a wireless communications network, to provide positioning assistance. In some other embodiments, the positioning apparatus 308 may be a positioning technology based on a Wi-Fi wireless access point. Because each Wi-Fi wireless access point has a globally unique MAC address, when Wi-Fi is enabled, an electronic device scans and collects broadcast signals of surrounding Wi-Fi wireless access points, and obtains MAC addresses broadcast by the Wi-Fi wireless access points. The electronic device sends data (for example, the MAC addresses) capable of indicating the Wi-Fi wireless access points to a positioning cloud server by using a wireless communications network. The cloud server retrieves a geographic location of each Wi-Fi wireless access point, calculates a geographic location of the electronic device in combination with strengths of the Wi-Fi broadcast signals, and sends the geographic location to the positioning apparatus 308 of the electronic device.

The audio frequency circuit 309, a speaker 313, and a microphone 314 may provide audio interfaces between the user and the electronic device 300. The audio frequency circuit 309 may convert received audio data into an electrical signal and transmit the electrical signal to the speaker 313. The speaker 313 converts the electrical signal into a sound signal for output. In addition, the microphone 314 converts the collected sound signal into an electrical signal. The audio frequency circuit 309 receives the electrical signal, converts the electrical signal into audio data, and then outputs the audio data to the RF circuit 302 to send the audio data to, for example, another mobile phone, or outputs the audio data to the memory 303 for further processing.

The peripheral interface 310 is configured to provide various interfaces for external input/output devices (for example, a keyboard, a mouse, an external display, an external memory, and a subscriber identity module card). For example, the peripheral interface 310 is connected to the mouse by using a universal serial bus (USB) interface, and is connected, by using a metal contact on a card slot of a subscriber identity module (SIM) card, to the subscriber identity module card provided by a telecommunications operator. The peripheral interface 310 may be configured to couple the foregoing external input/output devices to the processor 301 and the memory 303.

The electronic device 300 may further include the power apparatus 311 (for example, a battery and a power management chip) for supplying power to each part. The battery may be logically connected to the processor 301 by using the power management chip, thereby implementing functions such as charging management, discharging management, and power consumption management by using the power apparatus 311.

Although not shown in FIG. 3, the electronic device 300 may further include a camera (a front-facing camera and a rear-facing camera), a camera flash, a mini-sized projector, a near field communication apparatus, and the like that are not described herein.

The following embodiments in this application all can be implemented in the electronic device 300 having the foregoing hardware structure.

Figure 4:
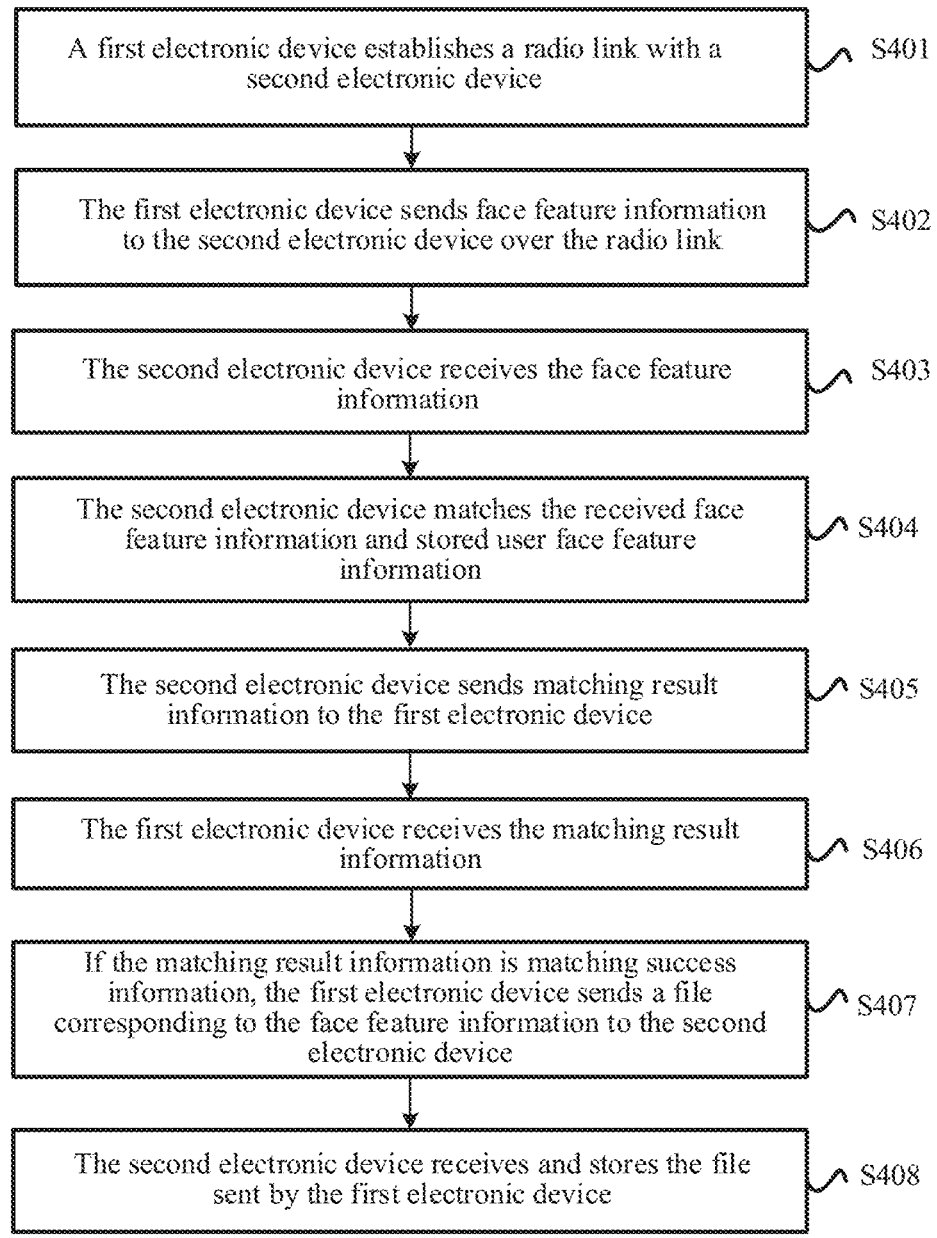
FIG. 4 is a schematic flowchart of an image sharing method in some embodiments.

As shown in FIG. 4, an embodiment of this application provides an image sharing method. The method may be implemented in a first electronic device and a second electronic device. The foregoing two electronic devices may be electronic devices 300 each having the foregoing hardware structure. The method may specifically include the following steps.

Step S401: The first electronic device establishes a first wireless link with the second electronic device by using a short-range wireless communications technology. The short-range wireless communications technology in this embodiment of this application may be a technology capable of implementing short-range communication, for example, Wi-Fi, Bluetooth, ZigBee, IrDA, or ultra-wideband. The first wireless link established between the first electronic device and the second electronic device indicates that geographic locations of the two electronic devices are quite close. For example, the two electronic devices are connected to a same Wi-Fi hotspot.

Step S402: The first electronic device sends face feature information to the second electronic device over the first wireless link.

In some embodiments of this application, the face feature information may be specifically one type of biological feature information that is obtained through analysis after intelligent identification is performed on a photo in an album application. For example, an album application of the first electronic device includes various captured photos. Some photos are landscape photos, some photos are portraits, some photos are selfie photos, and the like. The first electronic device may perform big data analysis on a photo in the album based on a computing capability of the first electronic device, to obtain face feature information of the photo. Each photo or video may correspond to one or more pieces of face feature information. The one or more pieces of face feature information are extracted from one or more characters in the photo or video. It may be understood that there is no character in some photos, and therefore face feature information corresponding to the photos may be considered as a null value. In addition, the first electronic device may further place photos having same face feature information in a same sub-album. In this way, when the user enables the sub-album, the user may conveniently see all photos of a character corresponding to the face feature information.

In addition, for data security, the face feature information may be encrypted and then sent to the second electronic device. After receiving the encrypted data, the second electronic device may obtain the face feature information by using a corresponding algorithm.

Step S403: The second electronic device receives the face feature information.

Step S404: The second electronic device matches the received face feature information and stored user face feature information.

In this embodiment of this application, a user of the second electronic device is described as follows: For example, the second electronic device is a mobile phone having an iOS operating system, and therefore an iCloud account (for example, dingoly@icloud.com) logged in to the mobile phone may be considered as a user of the mobile phone. Face feature information that is collected and stored in the mobile phone and that corresponds to the account is user face feature information; and fingerprint information that is collected and stored in the mobile phone and that corresponds to the account is user fingerprint information. For another example, the second electronic device is a mobile phone having an Android operating system, and therefore a Google account (for example, dingoly@gmail.com) logged in to the mobile phone may be considered as a user of the mobile phone. Face feature information that is collected and stored in the mobile phone and that corresponds to the account is user face feature information; and fingerprint information that is collected and stored in the mobile phone and that corresponds to the account is user fingerprint information.

In this embodiment of this application, the second electronic device stores the user face feature information. The user face feature information may be used to unlock a screen. For example, when the screen is locked, a camera of the second electronic device collects face feature information; the second electronic device matches the collected face feature information and the user face feature information; and if the matching succeeds, the second electronic device unlocks the screen, so that a home screen or another interface is displayed on a touchscreen of the second electronic device, to help the user perform a subsequent operation. The user face feature information may be further used for mobile payment. For example, when receiving mobile payment request information, the second electronic device may matchcollected face feature information and the user face feature information; and if the matching succeeds, the second electronic device authorizes a related application to perform the mobile payment.

In this embodiment of this application, the second electronic device needs to match the face feature information received from the first electronic device and the user face feature information stored in the second electronic device, so that the second electronic device determines whether the user of the second electronic device is in an image corresponding to the face feature information.

It may be understood that, the first electronic device may further store face feature information of a user of the first electronic device. Correspondingly, the first electronic device may also use the face feature information to perform the foregoing operation such as screen lock or mobile payment.

Step S405: The second electronic device sends a matching result to the first electronic device over the first wireless link. The matching result may be information indicating matching success, that is, the second electronic device determines that the face feature information sent by the first electronic device is consistent with the user face feature information of the second electronic device. The matching result may be information indicating matching failure, that is, the second electronic device determines that the face feature information sent by the first electronic device is inconsistent with the user face feature information of the second electronic device.

Step S406: The first electronic device receives the matching result.

Step S407: When the first electronic device determines that the matching result is matching success information, the first electronic device sends an image (for example, a photo or a video) corresponding to the face feature information to the second electronic device.

After receiving the matching result, the first electronic device performs parsing to learn that the matching result is matching success information, and therefore the first electronic device may automatically send the image corresponding to the face feature information to the second electronic device. In some other embodiments of this application, alternatively, before sending the foregoing image, the first electronic device may pop up a prompt box on a touchscreen, to remind the user of whether to send the image. After receiving a determining operation of the user, the first electronic device sends the foregoing image to the second electronic device.

S408: The second electronic device receives and stores the image sent by the first electronic device.

After the second electronic device stores the foregoing image, the second electronic device may generate a sub-album in an album application. Content of the sub-album is the image sent by the first electronic device, and a name of the sub-album may be "image shared by the first electronic device".

According to the foregoing embodiment, the first electronic device may automatically send an image (for example, a photo or a video) related to a user of the second electronic device to the second electronic device without an operation of a user of the first electronic device. In this way, image sharing efficiency of an electronic device is increased, an intelligent image processing capability of the electronic device is also improved, and user experience is also improved. In some other embodiments of this application, before step S401, the method may further include the following steps:

Step S400A: The first electronic device sends request information to a cloud server, where the request information may include user identifier information of the first electronic device. The user identifier information may be, for example, an iCloud account, a Google account, a Huawei cloud service account, or the like that is logged in to the first electronic device. The user identifier may alternatively be an identifier of the first electronic device. The identifier of the electronic device may be a universally unique identifier (universally unique identifier, UUID). The UUID is a number generated on an electronic device, and ensures that the UUID is unique for all electronic devices. The identifier of the electronic device may be an International Mobile Equipment Identity (international mobile equipment identity, IMEI), or may be a mobile equipment identifier (mobile equipment identifier, MEID). It may be understood that in this application, the identifier of the first electronic device is not limited to examples listed above, and may further include another type. This is not limited in this embodiment.

Step S400B: The first electronic device receives location sharing information sent by the cloud server. The location sharing information includes user identifier information of another electronic device, for example, an account of the user of the second electronic device. The another electronic device is an electronic device that is determined by the cloud server and that is within a preset geographic range (for example, within 10 meters) of the first electronic device. The electronic device, for example, the second electronic device, is nearby the first electronic device. In this case, a wireless connection may be established between the first electronic device and the second electronic device by using a short-range communications technology, to facilitate subsequent image sharing between the first electronic device and the second electronic device.

In some other embodiments of this application, if the location sharing information received by the first electronic device includes two or more other electronic devices, for example, includes the second electronic device and a third electronic device, the first electronic device may determine one in the two electronic devices to establish a wireless connection and send the face feature information. For example, the first electronic device may remind, on the touchscreen, the user to select an electronic device to which the face feature information is sent. After receiving a selection operation of the user, in response to the selection operation, the first electronic device determines the selected electronic device (which is, for example, the second electronic device). Therefore, in step S401, the first electronic device actively initiates wireless link establishment request information to the second electronic device, but the third electronic device cannot receive the request information of the first electronic device. In this way, the first electronic device may determine one electronic device that is in a plurality of electronic devices and to which the face feature information is sent, so that a problem of privacy disclosure caused by sending the face feature information to the plurality of electronic devices is avoided, and processing efficiency of the first electronic device is also increased.

In some other embodiments of this application, step S400A may specifically include: Only when the first electronic device receives an operation of enabling an album application, the first electronic device sends location sharing request information to the cloud server. In this way, only when it is determined that the user needs to share an image, the first electronic device triggers subsequent steps of the image sharing method. Therefore, a resource of the first electronic device can be saved.

In some other embodiments of this application, the face feature information sent by the first electronic device to the second electronic device in step S402 in the foregoing embodiment may be specifically face feature information corresponding to a recently captured image in the album application. The recently captured image is an image that was captured in several days prior to a current date, for example, face feature information in a photo/video that was captured in last three days. Correspondingly, in step S407, the image corresponding to the face feature information may be a photo/video that was captured in last three days, or the like. Advantages of sending the recently captured image instead of all images corresponding to the face feature information are that resource waste of the first electronic device is reduced, and a capability of intelligent interaction between the first electronic device and the user is also improved.

In some embodiments of this application, the first electronic device may send the face feature information over the first wireless link. When the received matching result information is matching success information, the first electronic device may transmit the image corresponding to the face feature information to the second electronic device over a second wireless link. A standard transmission rate of the first wireless link may be less than a standard transmission rate of the second wireless link. For example, the first wireless link may be a Bluetooth link established between the first electronic device and the second electronic device by using a Bluetooth protocol, and the second wireless link may be a Wi-Fi link established between the first electronic device and the second electronic device by using a Wi-Fi protocol.

For another example, the first wireless link may be a Bluetooth link, and the second wireless link may be a Long Term Evolution (Long Term Evolution, LTE) wireless link. An image file of the face feature information is usually relatively large. Therefore, the image file needs to be carried by using a wireless link having a high standard transmission rate, so that transmission efficiency of an electronic device is increased, and user experience is also improved.

In some other embodiments of this application, step S407 may specifically include the following steps:

Step S407A: When the matching result information is matching success information, the first electronic device displays the image corresponding to the face feature information on a touchscreen, and reminds a user of Whether to share the image with another user.

Step S407B: The first electronic device detects a first operation.

Step S407C: In response to the first operation, the first electronic device sends the image to the second electronic device over the first wireless link or the second wireless link.

In this embodiment, the first electronic device may first pop up a prompt box on the touchscreen, to remind the user of whether to send the image. Only after the user taps a sending indication control, the first electronic device sends the image to the second electronic device. In this way, the first electronic device can be prevented from incorrectly sending an image that the user is unwilling to share to the second electronic device, thereby improving user experience.

In some other embodiments of this application, when step S407 is being performed but has not been completed (that is, the first electronic device is sending the image corresponding to the face feature information but has not completed sending of all of the image), the first electronic device may further detect a distance from the second electronic device in real time. If the first electronic device determines that the distance between the first electronic device and the second electronic device is being increased and the distance is greater than or equal to a preset distance threshold, it indicates that the user of the first electronic device is being far away from the user of the second electronic device, and a signal strength of the first wireless link established between the two electronic devices is being weakened (or even weakened to the point that the first wireless link is disconnected). Then, the first electronic device may automatically stop step S407 of image sharing. For a remaining image that is not sent, when the user enables the album application next time, the user is reminded of whether to choose to continue to share the image with the second electronic device in another manner. For example, the remaining image that is not sent is sent by using an LTE network. If the first electronic device receives a determining operation of the user, the first electronic device sends the remaining image by using the LTE network.

In some other embodiments of this application, when step S407 is being performed but has not been completed (that is, the first electronic device is sending the image corresponding to the face feature information but has not completed sending of all of the image), the first electronic device may further detect a signal strength of the first wireless link in real time. If the first electronic device determines that the signal strength of the first wireless link is being weakened and the signal strength is weakened to a value less than or equal to a preset strength threshold, it indicates that a distance between the first electronic device and the second electronic device is being increased. Therefore, the first electronic device may automatically stop step S407 of image sharing. For a remaining image that is not sent, when the user enables the album application next time, the user is reminded of whether to choose to continue to share the image with the second electronic device in another manner. For example, the remaining image that is not sent is sent by using an LTE network. If the first electronic device receives a determining operation of the user, the first electronic device sends the remaining image by using the LTE network.

Figure 6A:
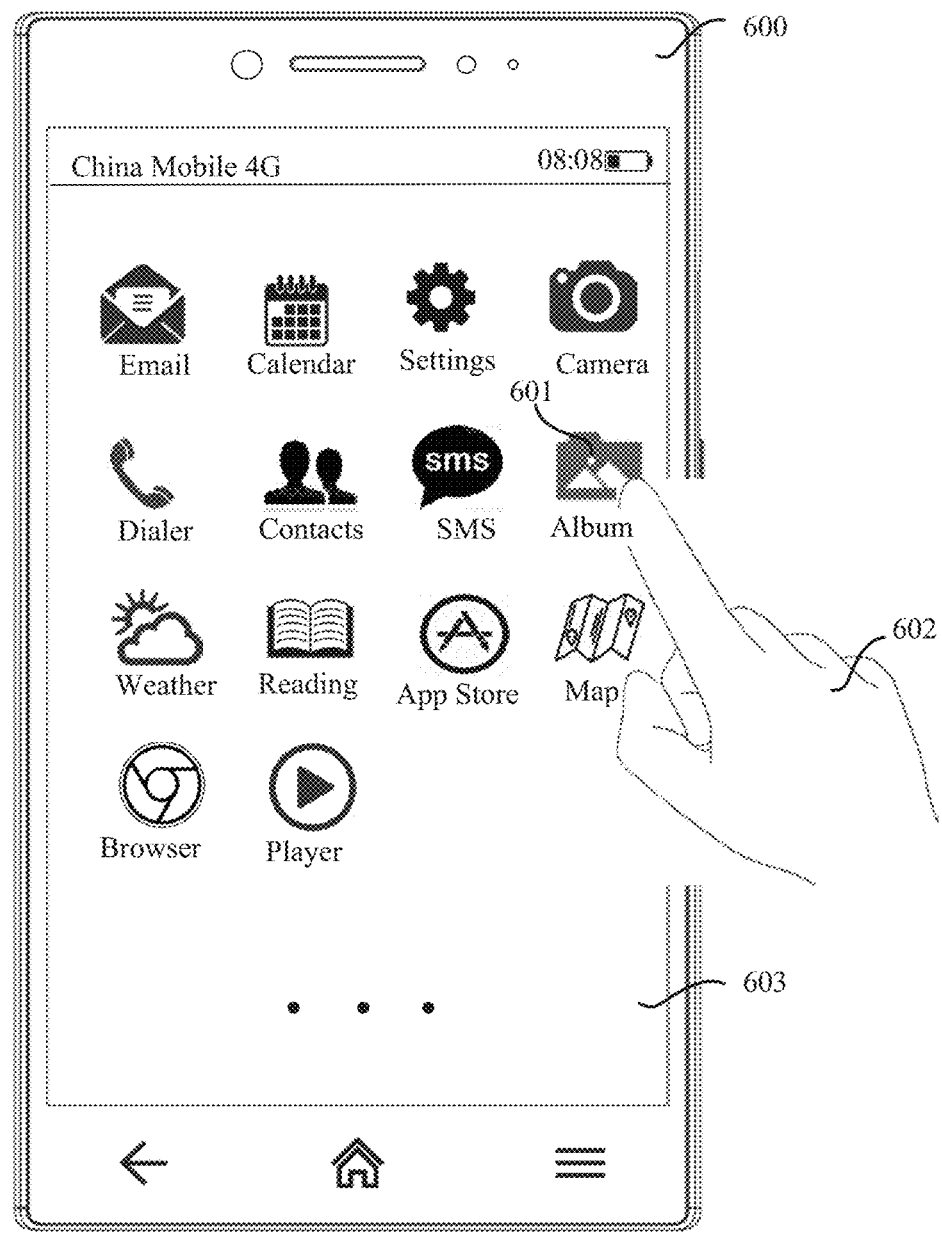
FIG. 6A to FIG. 6D are schematic diagrams of some graphical user interfaces displayed on a mobile phone 600 in some embodiments.
Figure 6B:
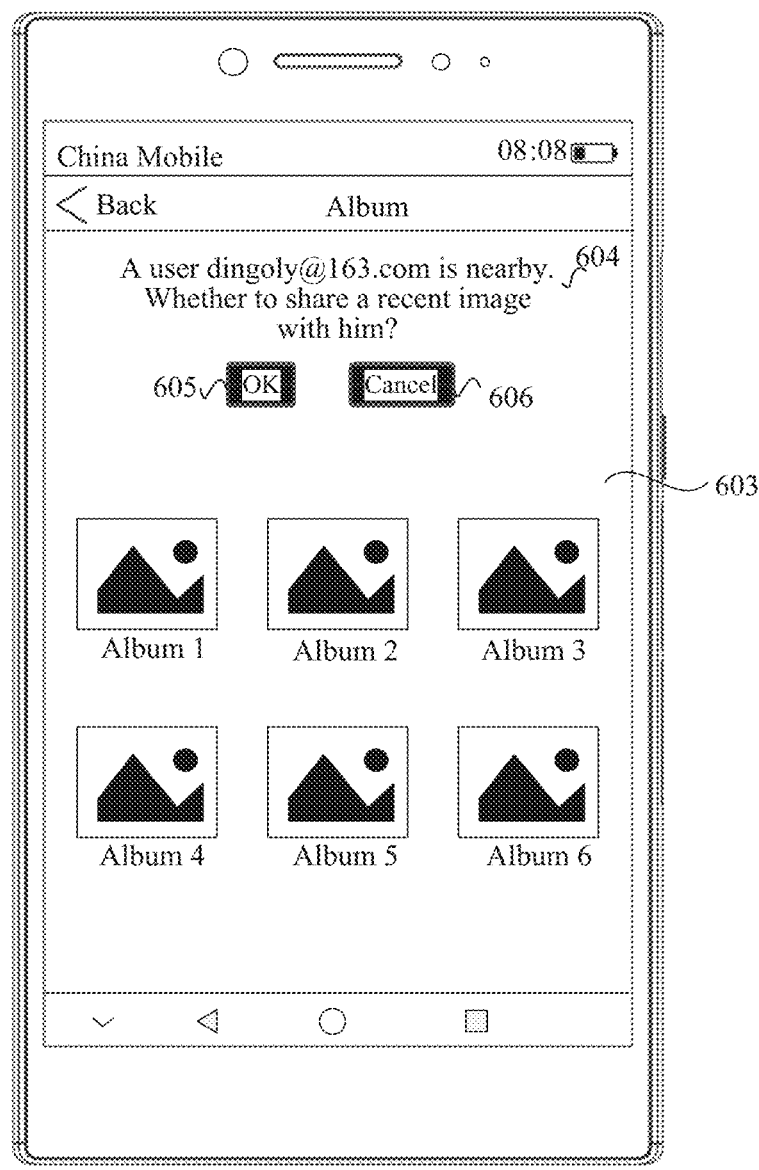

For example, FIG. 6A to FIG. 6D present a specific application scenario of the foregoing embodiment. FIG. 6 shows a graphical user interface (graphical user interface, GUI) displayed on a touchscreen 603 of a mobile phone 600. The GUI includes icons of a plurality of application programs, a status bar, and the like. When detecting a touch gesture of a finger 602 of a user on an icon 601 of an album application, in response to the touch gesture, the mobile phone 600 displays a user interface of the album application on the touchscreen 603, as shown in FIG. 6B. Six albums are displayed in FIG. 6B, and each album stores various photos, videos, and the like.

After the user interface of the album application is displayed on the touchscreen 603, the mobile phone 600 may detect whether there is another electronic device (for example, a mobile phone 700) nearby the mobile phone 600. A specific detection method may use steps S400A and S400B in the foregoing embodiment. It may be understood that in some other embodiments of this application, the mobile phone 600 may alternatively actively find another nearby electronic device by using a proprietary protocol. There may be a plurality of specific technical solutions about how the mobile phone 600 finds another nearby electronic device. This is not limited in this embodiment of this application.

Figure 6C:
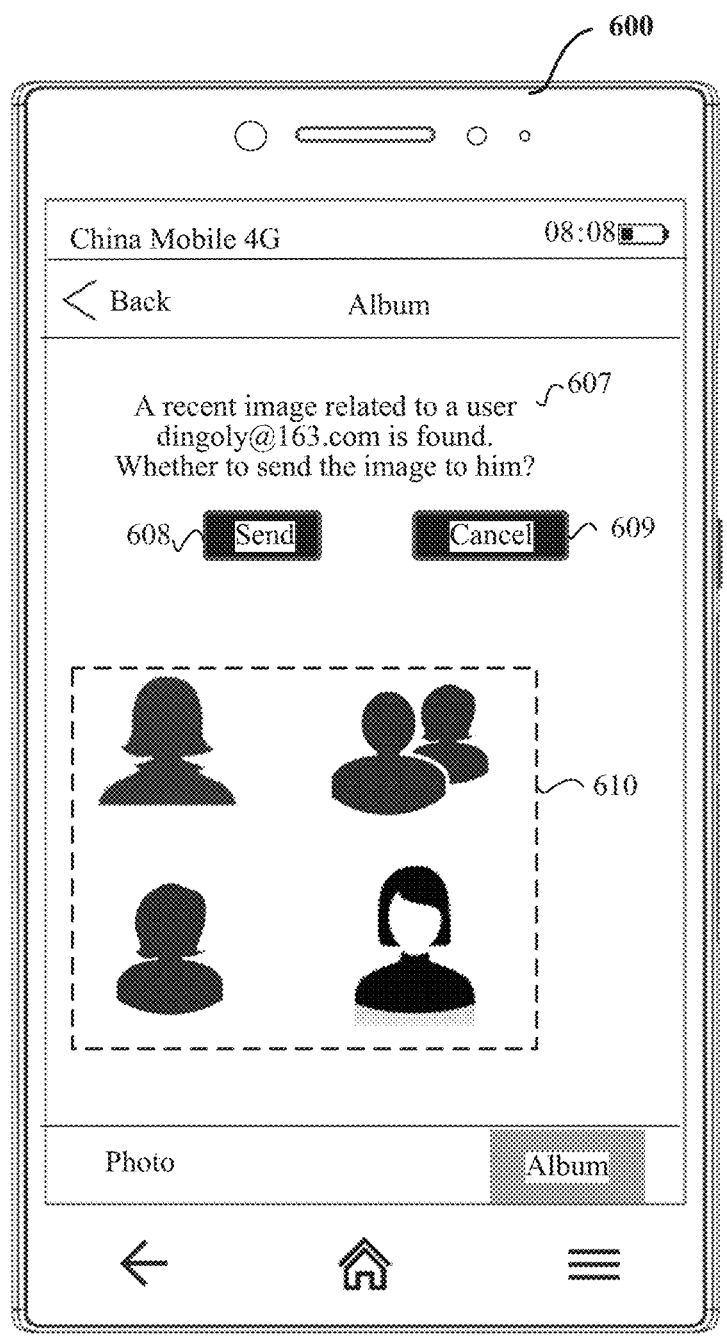

After the mobile phone 600 finds that there is the mobile phone 700 nearby, the mobile phone 600 may establish a wireless link with the mobile phone 700 through a short-range communications technology. Then the mobile phone 600 sends encrypted face feature information to the mobile phone 700 over the wireless link. The mobile phone 700 may verify the face feature information. Specifically, the mobile phone 700 matches the face feature information and user face feature information of the mobile phone 700. The mobile phone 600 may receive a matching result of the mobile phone 700. When the matching result is matching success, as shown in FIG. 6B, a dialog box 604 may be further displayed on the touchscreen 603. The dialog box 604 indicates that the mobile phone 600 reminds a user of whether to share a recent image with a user of the mobile phone 700. In addition, a control 605 and a control 606 may be further displayed on the touchscreen 603. After the control 606 is touched, it indicates that the user does not agree to share the recent image with the foregoing electronic device. After the control 605 is touched, it indicates that the user agrees to share the recent image with the detected electronic device. In this case, in response to an operation of touching the control 605, the mobile phone 600 displays the recent image (for example, a video or a photo) corresponding to the face feature information on the touchscreen. For example, recent images found by the mobile phone 600 are shown in an area 610 in FIG. 6C. In FIG. 6C, a dialog box 607 is configured to remind the user that the images are found and Whether to share the images with the user of the mobile phone 700 (dingoly@163.com). The user may touch a control 608 by using a finger. In response to this touch operation, the mobile phone 600 may share the images in the area 610 with the mobile phone 700 by using the wireless link.

Figure 7:
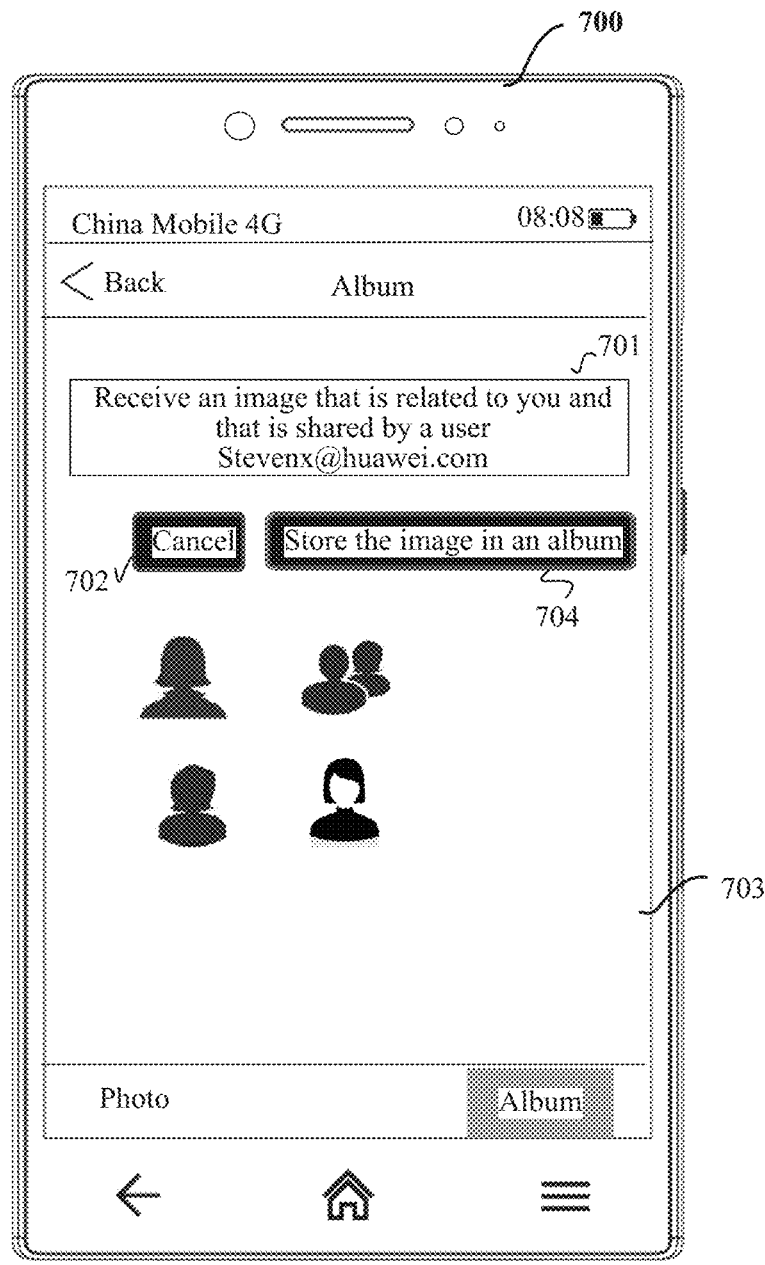
FIG. 7 is a schematic diagram of some graphical user interfaces displayed on a mobile phone 700 in some embodiments.

For example, as shown in FIG. 7, in some other embodiments of this application, before the mobile phone 700 receives the foregoing image, a preview of the image to be received may be displayed on a touchscreen 703 of the mobile phone 700, and a prompt box 701 and related controls 702 and 704 are displayed. The control 702 indicates that the user can refuse to receive the images, and the control 704 indicates that the user can agree to receive the images and store the images in an album.

Figure 6D:
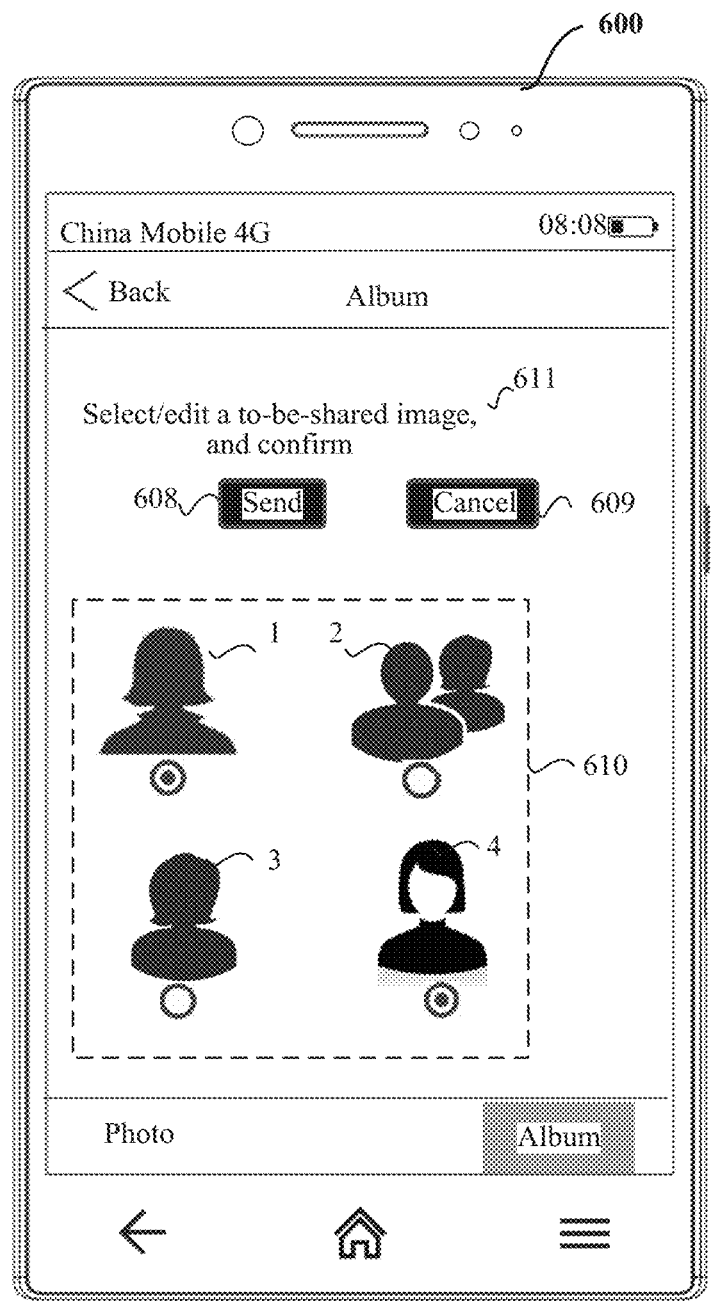

In some other embodiments of this application, before the mobile phone 600 shares the images in the area 610, the user of the mobile phone 600 may further select or edit an image in the area 610. For example, as shown in FIG. 6D, the user may determine the images in the area 610 again: An image 1 and an image 4 are selected by the user and shared with the mobile phone 700, but an image 2 and an image 3 are not selected by the user and are not shared with the mobile phone 700. The user determines, by using a prompt box 611, to complete the selection operation, and sends the image 1 and the image 4 to the mobile phone 700. In the foregoing embodiment and the technical solution described in FIG. 6D, an operation of enabling the user to perform selection is provided, so that a capability of intelligent interaction between the electronic device and the user is improved. For example, the foregoing embodiment and specific technical solutions in the accompanying drawings may be applied to the following scenario: A user A has a mobile phone a in which login is performed by using an iCloud account (dingoly@icloud.com), and a user B has a mobile phone b in which login is performed by using a Google account (StevenX@gmail.com). The user A and the user B visit scenic spots in Beijing on weekend, and capture many images respectively by using their mobile phones in two days. The two persons have supper together in a restaurant, and the two mobile phones are both connected to a hotspot in the restaurant. After the user A unlocks the mobile phone a and enables an album application, a prompt box pops up on a touchscreen of the mobile phone a, to remind the user A that the user B nearby is found, and whether to share images that are related to the user B and that are captured recently (for example, in the two days) with the user B. After the user taps a "send" button, the mobile phone a may send the images to the mobile phone b of the user B over a Wi-Fi wireless link, and the mobile phone may alternatively send the images to the mobile phone over a Bluetooth link.

Figure 5:
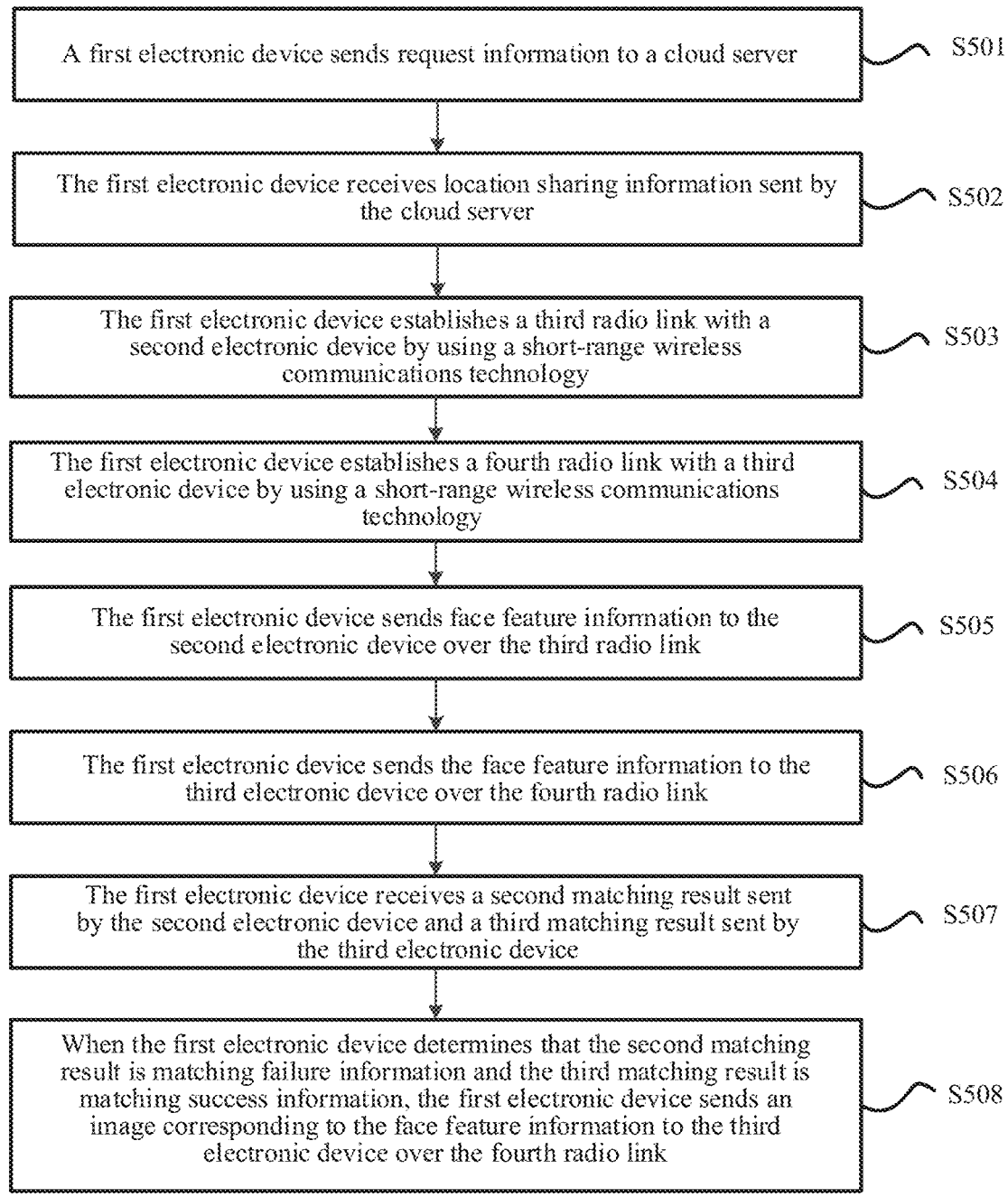
FIG. 5 is a schematic flowchart of an image sharing method in some other embodiments.

In some other embodiments of this application, if location sharing information received by a first electronic device includes two or more other electronic devices, for example, includes a second electronic device and a third electronic device, the first electronic device may establish a wireless connection to both the second electronic device and the third electronic device. The first electronic device, the second electronic device, and the third electronic device each may have the hardware structure shown in FIG. 3. Therefore, an embodiment of this application provides an image sharing method. As shown in FIG. 5, the method may include the following steps.

Step S501: The first electronic device sends request information to a cloud server, wherein the request information may include user identifier information of the first electronic device.

Step S502: The first electronic device receives location sharing information sent by the cloud server. The location sharing information includes user identifier information of the second electronic device and user identifier information of the third electronic device. The two electronic devices are electronic devices that are determined by the cloud server and that are within a preset geographic range (for example, within 10 meters) of the first electronic device. This indicates that the two electronic devices are nearby the first electronic device. In this case, a wireless connection may be established between the first electronic device and the two electronic devices by using a short-range communications technology, to facilitate subsequent image sharing between the first electronic device and the two electronic devices.

Step S503: The first electronic device establishes a third wireless link with the second electronic device by using a short-range wireless communications technology. The short-range wireless communications technology in this embodiment of this application may be a technology capable of implementing short-range communication, for example, Wi-Fi, Bluetooth, ZigBee, IrDA, or ultra-wideband.

Step S504: The first electronic device establishes a fourth wireless link with the third electronic device by using a short-range wireless communications technology.

Step S505: The first electronic device sends face feature information to the second electronic device over the third wireless link.

Step S506: The first electronic device sends the face feature information to the third electronic device over the fourth wireless link.

Step S507: The first electronic device receives a second matching result sent by the second electronic device and a third matching result sent by the third electronic device.

Step S508: When the first electronic device determines that the second matching result is matching failure information and the third matching result is matching success information, the first electronic device sends an image corresponding to the face feature information to the third electronic device over the fourth wireless link. This indicates that a user of the second electronic device is not a character in the foregoing image, and a user of the third electronic device is a character in the foregoing image. Therefore, the first electronic device sends the image corresponding to the face feature information to the third electronic device other than the second electronic device, so that data security is protected.

In FIG. 5 and the embodiment shown in FIG. 5, step S504 may alternatively be performed before step S503; and step S506 may alternatively be performed before step S505. This is not limited in this embodiment of this application.

The first electronic device in this embodiment of this application sends the face feature information to all other nearby electronic devices. After receiving two or more matching results, the first electronic device sends the image corresponding to the face feature information to only another electronic device whose matching result indicates matching success (for example, the foregoing third electronic device). In this way, the first electronic device can share a recent image in a quite convenient and safe manner, thereby increasing efficiency of the first electronic device, and also improving user experience.

Figure 8:
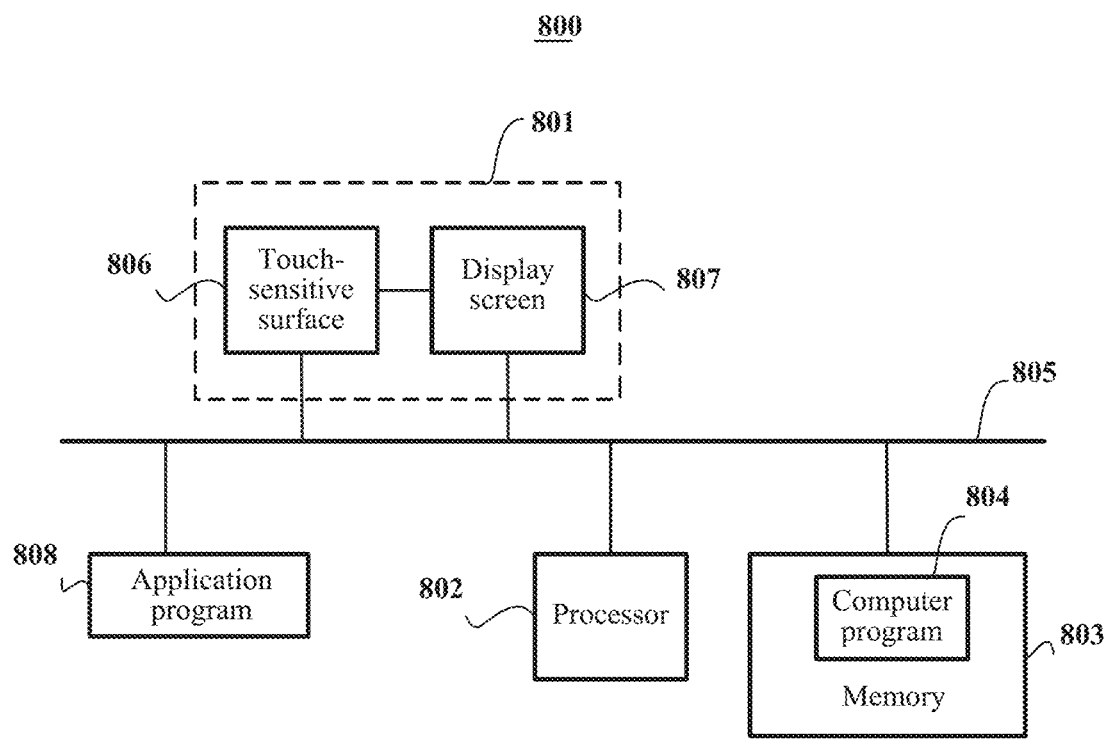
FIG. 8 is a schematic diagram of a hardware structure of an electronic device in some embodiments.

As shown in FIG. 8, some other embodiments of this application disclose an electronic device 800. The electronic device 800 may include: a touchscreen 801, where the touchscreen 801 includes a touch-sensitive surface 806 and a display screen 807; one or more processors 802; a memory 803; a plurality of application programs 808; and one or more computer programs 804. The components may be connected by using one or more communications buses 805. The one or more computer programs 804 are stored in the memory 803 and are configured to be executed by the one or more processors 802. The one or more computer programs 804 include instructions. The instructions are configured to perform steps in FIG. 4 and a corresponding embodiment. In some other embodiments of this application, the instructions may alternatively be configured to perform steps in FIG. 5 and a corresponding embodiment.

Figure 9:
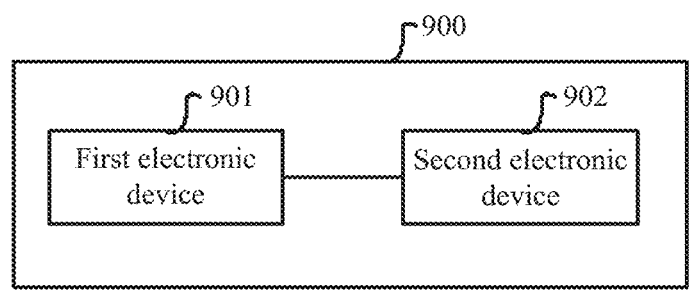
FIG. 9 is a schematic structural diagram of an image sharing system in some embodiments.

As shown in FIG. 9, an embodiment of this application further provides an image sharing system 900. The system includes a first electronic device 901 and a second electronic device 902. The first electronic device 901 and the second electronic device 902 may each have the hardware structure shown in FIG. 3 and a related embodiment. The system may perform specific steps in FIG. 4 and the embodiment corresponding to FIG. 4. Details are not described herein again.

It should be understood that although terms such as "first" and "second" may be used to describe various electronic devices in the foregoing embodiments, the electronic devices should not be limited by the terms. The terms are used to only distinguish an electronic device from another electronic device. For example, the first electronic device may be named as the second electronic device. Similarly, the second electronic device may alternatively be named as the first electronic device. This does not depart from the scope of the embodiments of this application.

As used in the foregoing embodiments, based on the context, the term "if" may be interpreted as a meaning of "when", "after", "in response to determining . . .", or "in response to detecting . . .". Similarly, based on the context, the phrase "if determining" or "if detecting (a stated condition or event)" may be interpreted as a meaning of "when determining . . .", "in response to determining . . .", "when detecting (a stated condition or event)", or "in response to detecting . . . (a stated condition or event)".

The terms used in the foregoing embodiments are merely for the purpose of illustrating specific embodiments, and are not intended to limit this application. The terms "a", "said" and "the" of singular forms used in the embodiments and the claims are also intended to include plural forms, unless otherwise specified in the context clearly. It should also be understood that, the term "and/or" used herein indicates and includes any or all possible combinations of one or more associated listed items.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions based on the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, cloud server, or data center to another website, computer, cloud server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a cloud server or a data center, integrating one or more usable media. The usable medium may be a magnetic medium (for example, a floppy disk, a hard disk, or a magnetic tape), an optical medium (for example, DVD), a semiconductor medium (for example, a solid-state drive), or the like.

For a purpose of explanation, the foregoing descriptions are described with reference to specific embodiments. However, the foregoing examples of discussion are not intended to be detailed, and are not intended to limit this application to a disclosed precise form. According to the foregoing teaching content, many modification forms and variation forms are possible. Embodiments are selected and described to fully illustrate the principles of the technical solutions and practical application of the principles, so that another person skilled in the art can fully use technical solutions and various embodiments that have various modifications applicable to conceived specific usage.

What is claimed is:

1. An image sharing system, comprising:
 a second electronic device; and
 a first electronic device comprising a touchscreen and communicatively coupled w the second electronic device, wherein the first electronic device is configured to:
  display a home screen on the touchscreen, wherein the home screen comprises an icon of an album application;
  detect a first gesture of a first user on the icon of the album application;
  display a plurality of albums in response to detecting the first gesture;
  establish a Bluetooth link with the second electronic device;
  send face feature information to the second electronic device over the Bluetooth link;
  receive a matching result from the second electronic device over the Bluetooth link;
  display a first sharing reminder when the matching result is matching success information, wherein the first sharing reminder indicates whether the first user wants to share images corresponding to the face feature information with a second user;
  detect a second gesture on the first sharing reminder;
  display a second sharing reminder and a plurality of images comprising, the face feature information, wherein the plurality of images are images of the plurality of albums, and wherein the second sharing reminder indicates whether the first user wants to share the plurality of images with the second user;
  detect a third gesture on the second sharing reminder; and
  in response, to the third gesture:
   establish a Wi-Fi link with the second electronic device; and
   send the plurality of images comprising the face feature information to the second electronic device over the Wi-Fi link,
 wherein the second electronic device is configured to:
  establish the Bluetooth link with the first electronic device;
  receive the face feature information from the first electronic device over the Bluetooth link;
  match the face feature information with stored second user face feature information;
  send the matching result to the first electronic device over the Bluetooth link;
  establish the Wi-Fi link with the first electronic device;

display a third sharing reminder regarding whether the second user wants to accept the plurality of images comprising the face feature information;
receive the plurality of images over the link after displaying the third sharing reminder;
generate a sub-album in an album application after receiving the plurality of images, wherein a name of the sub-album indicates that the sub-album can store images shared by the first electronic device; and
store the plurality of images in the sub-album.

2. The image sharing system of claim 1, wherein the face feature information is biological feature information.

3. The image sharing system of claim 1, further comprising encrypting the face feature information before sending the face feature information to the second electronic device.

4. The image sharing system of claim 1, wherein the stored second user face feature information is stored using a cloud account of the second user.

5. A first electronic device, comprising:
a touchscreen;
one or more processors coupled to the touchscreen; and
a memory coupled to the one or more processors and storing instructions which, when executed by the one or more processors, cause the first electronic device to be configured to:
display a home screen on the touchscreen, wherein the home screen comprises an icon of an album application;
detect a first gesture of a first user on the icon of the album application;
display a plurality of albums in response to detecting the first gesture;
establish a Bluetooth link with a second electronic device;
send face feature information to the second electronic device over the Bluetooth link;
receive a matching result from the second electronic device over the Bluetooth link;
display a first sharing reminder when the matching result is matching success information, wherein the first sharing reminder indicates whether the first user wants to share images corresponding to the face feature information with a second user;
detect a second gesture on the first sharing reminder;
display a second sharing reminder and a plurality of images comprising the face feature information, wherein the plurality of images are images of the plurality of albums, and wherein the second sharing reminder enables the first user to indicate whether the first user wants to share the plurality of images with the second user;
receive a selection instruction in response to a selection of one or more images by the first user;
determine the one or more images according to the selection instruction, wherein the one or more images comprise the face feature information;
detect a third gesture on the second sharing reminder; and
in response to the third gesture:
establish a Wi-Fi link with the second electronic device; and
send the one or more images to the second electronic device over the Wi-Fi link.

6. The first electronic device of claim 5, wherein the face feature information is biological feature information.

7. The first electronic device of claim 5, further comprising encrypting the face feature information before sending the face feature information to the second electronic device.

8. A first electronic device, comprising:
a touchscreen;
one or more processors coupled to the touchscreen; and
a memory coupled to the one or more processors and storing instructions which, when executed by the one or more processors, cause the first electronic device to:
display a home screen on the touchscreen, wherein the home screen comprises an icon of an album application;
detect a touch gesture of a first user of the first electronic device on the icon of the album application;
display a plurality of albums, a first indication, and a second indication, wherein the first indication enables the first user to share images with a second user of a second electronic device, and wherein the second indication indicates that sharing images with the second user can be cancelled;
detect a first input on the first indication;
in response to the first input, display a plurality of images, a third indication, and a fourth indication, wherein the plurality of images comprises face feature information corresponding to the second user, wherein the third indication indicates that the plurality of images can be sent to the second user, and wherein the fourth indication indicates that sending the plurality of images to the second user can be cancelled.

9. The first electronic device of claim 8, wherein the instructions, when executed by the one or more processors, further cause the first electronic device to be configured to cease to display a main user interface in response to the first input.

10. The first electronic device of claim 8, Wherein the instructions, when executed by the one or more processors, further cause the first electronic device to be configured to:
display a first user interface of the album application;
receive a selection instruction in response to a selection of one or more images from the plurality of images; and
send the one or more images to the second electronic device through a second wireless link between the first electronic device and the second electronic device.

11. The first electronic device of claim 10, wherein the first user interface of the album application further comprises an account of the first user.

12. The first electronic device of claim 11, wherein the account of the first user is an iCloud account.

13. The first electronic device of claim 8, wherein the instructions, when executed by the one or more processors, further cause the first electronic device to be configured to display a main user interface of the album application on the touchscreen in response to the touch gesture, and wherein the plurality of albums, the first indication, and the second indication are displayed in the main user interface.

14. The first electronic device of claim 13, wherein the instructions, when executed by the one or more processors, further cause the first electronic device to be configured to:
send request information to a server, wherein the request information comprises first user identifier information of the first electronic device;
receive location sharing information from the server, wherein the location sharing information comprises second user identifier information of the second electronic device which is within a preset geographic range of the first electronic device; and determine the second electronic device to establish a first wireless link.

15. The first electronic device of claim 13, wherein the instructions, when executed by the one or more processors, further cause the first electronic device to be configured to:

establish a first wireless link with the second electronic device using a short-range wireless communications technology when displaying the main user interface of the album application;

send first face feature information to the second electronic device over the first wireless link, wherein the first face feature information is obtained from an image of the album application; and receive a matching result from the second electronic device over the first wireless link, wherein the matching result indicates that the first face feature information is consistent with second face feature information of the second user.

16. The first electronic device of claim 15, wherein the instructions, when executed by the one or more processors, further cause the first electronic device to be configured to:

display a first user interface of the album application;

receive a selection instruction in response to a selection of one or more images from the plurality of images; and send the one or more images to the second electronic device through a second wireless link between the first electronic device and the second electronic device, wherein the first wireless link is a Bluetooth link, and wherein the second wireless link is a Wi-Fi link.

17. The first electronic device of claim 8, wherein the plurality of images corresponds to recently captured images.

18. The first electronic device of claim 8, wherein the second user is a contact of the first electronic device.

19. The first electronic device of claim 8, wherein the face feature information is encrypted and sent to the second electronic device.

20. The first electronic device of claim 8, wherein the first indication button displayed on the touchscreen, and wherein the second indication is another button displayed on the touchscreen.

* * * * *

UNITED STATES PATENT AND TRADEMARK OFFICE
CERTIFICATE OF CORRECTION

PATENT NO. : 10,972,914 B2  
APPLICATION NO. : 16/492786  
DATED : April 6, 2021  
INVENTOR(S) : Wei Zhang Page 1 of 1

It is certified that error appears in the above-identified patent and that said Letters Patent is hereby corrected as shown below:

Claim 1, Column 20, Line 22: "coupled w the second" should read "coupled to the second"

Claim 1, Column 20, Line 45: "images comprising, the face" should read "images comprising the face"

Claim 1, Column 21, Line 4: "images over the link after" should read "images over the Wi-Fi link after"

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*